UNITED STATES PATENT OFFICE.

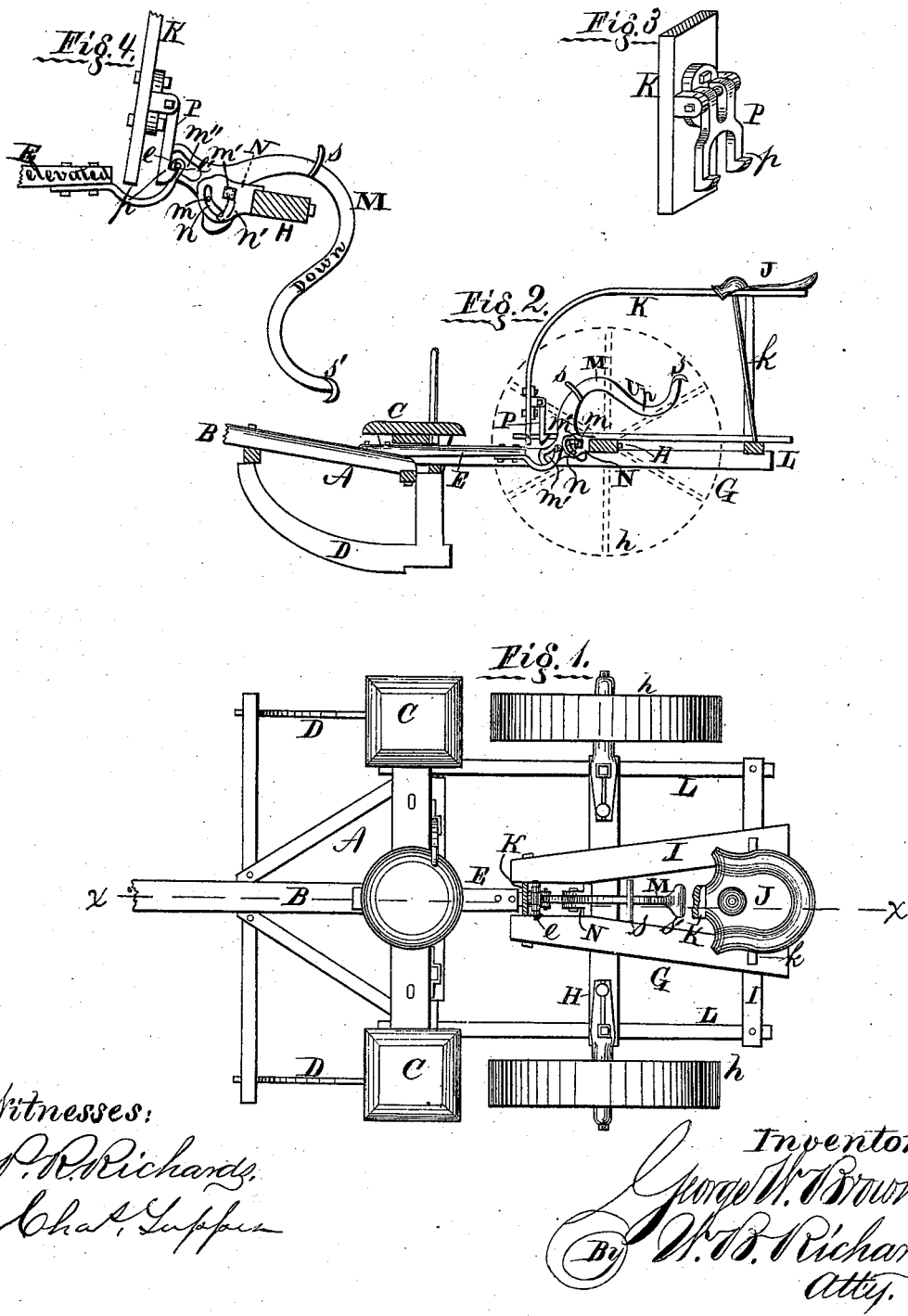

GEORGE W. BROWN, OF GALESBURG, ILLINOIS.

IMPROVEMENT IN CORN-PLANTERS.

Specification forming part of Letters Patent No. 177,465, dated May 16, 1876; application filed December 28, 1875.

*To all whom it may concern:*

Be it known that I, GEORGE W. BROWN, of Galesburg, county of Knox and State of Illinois, have invented certain Improvements in Corn-Planters, of which the following is a full, clear, and exact description, reference being had to the annexed drawing, making a part of this specification, and to the letters and figures of reference marked thereon.

Figure 1 of the accompanying drawing is a top view of a machine embodying my invention, with the seat-supporting bar partly broken away. Fig. 2 is a sectional view on the line $x\ x$, Fig. 1. Figs. 3 and 4 are detail views, hereinafter referred to.

This invention relates to improvements in that class of seed-planters in which a forward part carrying the seeding devices and furrow-openers is hinged to a rear part carrying the main supporting-wheels, and in which a pedal-lever is arranged accessible to the driver's feet hinged or journaled to the rear frame, and its forward end in contact with a projection from the forward frame in such manner that said forward part or frame may be raised and lowered by said lever; and the invention consists, first, in so constructing the pedal and connecting it with a projection from the forward part or frame that it may be used to force the runners downward, as well as to elevate them; second, in the use of a dual fulcrum for the pedal, whereby increased extent of motion, upward and downward, is secured of the forward frame; third, in the combination of a gravitating catch with said devices for engaging with the projection from the front frame for the purpose of sustaining said frame in an elevated position, when desired, all as hereinafter fully described.

Referring to the parts by letters, letter A represents the forward part or frame of an ordinary corn-planter carrying tongue B, seed-boxes C, runners or furrow-openers D, the usual seeding devices, and a projection, E, rearward from the central part of the frame A. G is the rear frame, constucted in an ordinary manner of axle H, supporting-wheels $h\ h$, frame-pieces I, seat J, seat-supports K and $k\ k$, and side frame-pieces L L hinged at their forward ends to the forward frame. M is the pedal-lever, fulcrumed near its forward end between and to ears N, which project from the axle H by a double fulcrum consisting, first, of studs $m$, which project laterally from the sides of the lever M through arc-shaped slots $n$ in the ears N; and second, of a stud, $m'$, extending across from one ear N to the other, and through an arc-shaped slot, $n'$, in the lever M. (Shown by dotted lines.) The forward end of the lever M has a slot, $m''$, through which a rod, $e$, passes, which rod $e$ is carried in the forked rear end of the projection E. The rear end of the lever M is provided with suitable enlargements $s\ s'$ for the driver's feet. P is a gravitating catch, hinged at its upper end to the rear side of the seat-supporting bar K, and its lower end formed into two bars placed astride the rear projection E, and provided with catches $p$, which swing under and engage with studs $e'$ on said projection E when the forward frame is raised. The catch P hangs vertical in its normal position, and the catches $p$ are beveled on one side, so that they are pushed aside by the ascending studs $e'$ when the forward frame is raised, until said studs $e'$ pass the catches $p$, and allow them to swing into place, as hereinbefore described. By pressing the catch P forward with the foot the frame A will be released and drop into working position, as shown at Fig. 2, bringing the lever M into the position shown at same figure, and with the studs $m$ resting in the lower ends of the slots $n$ as fulcrums. While in said position the driver may, with his feet on the enlargements $s$, press forward and force the runners D into the soil, when required, and by placing his feet on enlargements $s'$ he may, by pressing down the rear end of the lever M, elevate the frame A, the studs $m$ acting as fulcrums in the lower ends of the slots $n$ until the studs $e'$ reach a horizontal plane as high as the stud $m'$, which then becomes the fulcrum, resting in the upper end of the arc-shaped slot $n'$. By this change of fulcrum from a lower to a higher plane the studs $e'$ have a path in two arcs of circles, the one nearly vertical above the other, and by the change from a higher to a lower plane the same result is accomplished, thus giving more extended movement, both upward and downward, to the frame A than could be done with a single fulcrum, in which case the path of the studs $e'$ would be as much backward as upward after they reached in ascending the plane of the studs $n'$. The arc $n$ is described from a radius in the upper end of the arc $n'$, and the arc $n'$ from a radius in the lower end of the arc $n$.

It will be evident that all of the arcs $n$ $n'$ may be made in the jaws N, and the studs for fulcrums both be attached to the lever M, if desired.

I claim—

1. The pedal-lever M, having foot-rests $s$ at its rear end and slot $m''$ at its forward end, pivoted to the rear frame, and arranged to operate with the forward frame, as described, so as to increase the downward pressure on the forward frame, substantially as specified.

2. The lever M, arranged to operate on a double fulcrum, $m$ $m'$, so as to raise and lower the frame A, in the manner substantially as and for the purpose specified.

3. The gravitating catch P, having catches $p$ $p$ pivoted to the rear frame, and arranged to straddle the end of the projection E, and to swing under it, so as to engage with the studs $e'$, substantially as and for the purpose specified.

GEORGE W. BROWN.

Witnesses:
   I. S. PERKINS,
   LOREN STEVENS.